United States Patent
Rumreich et al.

(10) Patent No.: US 6,384,873 B1
(45) Date of Patent: May 7, 2002

(54) VECTOR MAGNITUDE CONTROL OF A COMB FILTER

(75) Inventors: Mark Francis Rumreich; John Kimball Lufkin, both of Indianapolis, IN (US)

(73) Assignee: Thomson Licensing S.A., Boulogne-Cedex (FR)

( * ) Notice: Subject to any disclaimer, the term of this patent is extended or adjusted under 35 U.S.C. 154(b) by 0 days.

(21) Appl. No.: 09/454,037

(22) Filed: Dec. 3, 1999

(51) Int. Cl.[7] .................................................. H04N 9/78
(52) U.S. Cl. ........................ 348/666; 348/667; 708/301
(58) Field of Search ................................ 348/664–670, 348/699–701, 571, 607, 625; 708/301; 382/260; H04N 9/78

(56) References Cited

U.S. PATENT DOCUMENTS

| | | | | |
|---|---|---|---|---|
| 4,146,840 A | * | 3/1979 | McRae et al. ................. 325/42 |
| 4,847,682 A | | 7/1989 | Tsinberg et al. ............... 358/31 |
| 5,371,789 A | * | 12/1994 | Hirano ........................ 379/410 |
| 5,416,531 A | | 5/1995 | Gai ............................. 348/663 |
| 5,416,532 A | | 5/1995 | Ko .............................. 348/665 |
| 5,508,753 A | | 4/1996 | Hatano ........................ 348/665 |
| 5,517,255 A | | 5/1996 | Gai et al. .................... 348/663 |
| 5,526,060 A | | 6/1996 | Raby ........................... 348/663 |
| 5,533,066 A | * | 7/1996 | Yamaguchi et al. ......... 375/341 |
| 5,533,120 A | * | 7/1996 | Staudacher .................. 379/392 |
| 5,576,837 A | * | 11/1996 | Strolle et al. ................. 386/73 |
| 5,687,229 A | * | 11/1997 | Sih ............................. 379/410 |
| 5,909,255 A | | 6/1999 | Hatano ........................ 348/663 |
| 5,999,954 A | * | 12/1999 | Ludwig et al. ............. 708/312 |
| 6,061,100 A | * | 5/2000 | Ward et al. .................. 348/607 |
| 6,246,827 B1 | * | 6/2001 | Strolle et al. ................. 386/33 |

* cited by examiner

*Primary Examiner*—Victor R. Kostak
(74) *Attorney, Agent, or Firm*—J. S. Tripoli; E. P. Herrmann

(57) ABSTRACT

Adaptive comb filter circuitry is responsive to chrominance vector absolute values to inhibit hanging dots. Chrominance vector absolute values are calculated by delaying bandpass filtered video signal to concurrently provide a plurality of sample absolute values. The plurality of sample absolute values are weighted and summed. The maximum and the minimum of the plurality of sample absolute values are selected and respectively weighted. The weighted maximum and minimum are combined with the sum of weighted samples to provide approximated chrominance vector absolute values. Exemplary circuitry is illustrated which develop real time chrominance vector magnitude values within 1.5-% p-p error. The vector magnitude approximation circuitry may be used for calculating vectors represented by successive samples which do not have an orthogonal relationship.

13 Claims, 3 Drawing Sheets

VECTOR MAGNITUDE CONTROL OF A COMB FILTER

This invention relates to circuitry for processing electronic signals, which convey information in vector form. An example of such a signal is the chrominance component of composite video signal.

BACKGROUND OF THE INVENTION

The invention, in part, is directed to determining the magnitude of a vector of a sampled signal. If respective samples of a signal are orthogonal components of a vector, the magnitude of the vector may be determined by forming the square root of the sum of squares of the orthogonal components. While the function may be straightforward to calculate on a computer, it is difficult to realize circuitry which can perform the function at video sample rates. If respective signal samples are not orthogonal components of the vector, the sum of squares algorithm will not produce the desired result at all.

Comb filters are the preferred circuitry for separating frequency-interleaved components of video signals. Of these, three line adaptive comb filters provide the best cost-performance trade off. The three line adaptive comb filter uses two one line delays to concurrently provide signals from three successive video lines. Adaptive control circuitry determines the proportions of video signal from the first and last lines to be combined with video signal from the middle line to produce separated video signal components.

Under certain signal conditions an adaptive comb filter will produce undesired hanging dots. It has been determined that control signals generated using the magnitude of vectors representing chrominance information in the respective lines may be utilized to minimize undesired hanging dots output by adaptive comb filters. Thus there is a need for apparatus to generate magnitudes of vectors at video rates. A need will also be demonstrated for a method and circuitry to generate magnitudes of vectors in sampled signals where respective samples are not orthogonal components of the vector.

SUMMARY OF THE INVENTION

A method of generating the magnitude of a sampled vector includes weighting a plurality of successive samples to produce a like plurality of magnitudes of weighted samples, determining the magnitude of the largest of the plurality of samples, weighting such magnitude to produce a maximum sample value, and summing the plurality of weighted samples and the maximum value.

Apparatus for determining a vector magnitude includes a tapped delay line for concurrently producing a plurality of samples. Respective weighting circuits are coupled to the respective taps and weighted samples are coupled to a first signal summer. A maximum detector is coupled to the respective taps for selecting the largest sample value. This sample value is weighted and applied to a further signal summer wherein it is added to the signal output from the first signal summer.

Exemplary utilization of this method and apparatus is found in an adaptive comb filter where the ratio of the magnitude of the chrominance component vector from a middle line of video signal to the average magnitude of the chrominance component vectors from first and last lines of video signal is used to control a soft switch to alter the content of separated luminance signal.

BRIEF DESCRIPTION OF THE DRAWINGS

The invention will be further explained in relation to the following drawings where.

DETAILED DESCRIPTION

The invention will be described in the environment of a video signal comb filter. The invention is not intended to be limited to this application however.

Figure 1:
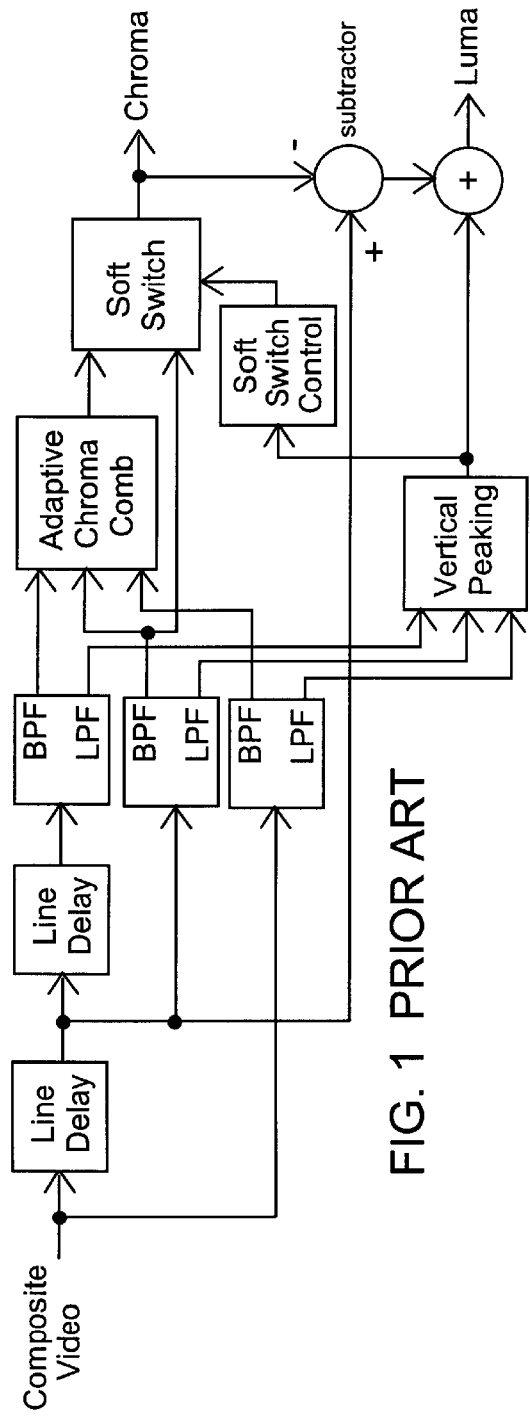
FIG. 1 is a block diagram of a prior art adaptive three line comb filter.

FIG. 1 illustrates a digital version of a three-line comb filter. In this example, the portion of the video signal spectrum occupied by the chrominance component in each line is separated via the band pass filters BPF. These signals are subtractively combined in the ADAPTIVE CHROMINANCE FILTER to produce comb filtered chrominance signal. The comb filtered chrominance component is then subtracted from one-line delayed wide band video signal to produce a separated luminance component. In FIG. 1, low-pass filtered signal from the three lines are compared in a VERTICAL PEAKING circuit to generate a peaking signal which is added to the comb filtered luminance Component. The peaking signal tends to enhance the luminance response.

Comb filters work well when there is a high degree of correlation between adjacent lines of video signal. If the adjacent lines of video signal are not well correlated, comb filter response degrades. Luminance dots (or more precisely, "cross-luminance") occurs when chrominance vertical detail is misinterpreted as luminance. Adaptive comb filters are less susceptible to this problem than simple comb filters because they select the signal form the first and last line with the highest correlation with the middle line for combining with the middle line. However, even adaptive comb filters produce luminance dots when processing video with one-line chrominance graphics. Good examples are the single line of red that frequently underscores the headlines on television news for example, or the thin blue line used to create a box around stock market "sidebars." These types of graphics are now very common.

Comb filters produce dots with one-line chrominance graphics because there is poor correlation between the problem line and both its adjacent lines.

Luminance dots may be prevented, in part, by selectively substituting bandpass filtered video signal for comb filtered chrominance signal applied to the luminance subtractor during periods of low interline correlation. During periods of substitution, the chrominance signal applied to the subtractor, which produces the luminance signal, is perfectly correlated and no luminance dots are produced. Unfortunately, the luminance component in this bandpassed portion of the signal spectrum is also perfectly correlated, thus eliminating the high frequency portion of the luminance signal.

Nominally switching is performed by a soft switch such that chrominance signal applied to the subtractor is proportioned between bandpassed and comb filtered chrominance signals. In the FIG. 1, the soft switch is controlled by the magnitude of the vertical detail or peaking signal.

Figure 2:
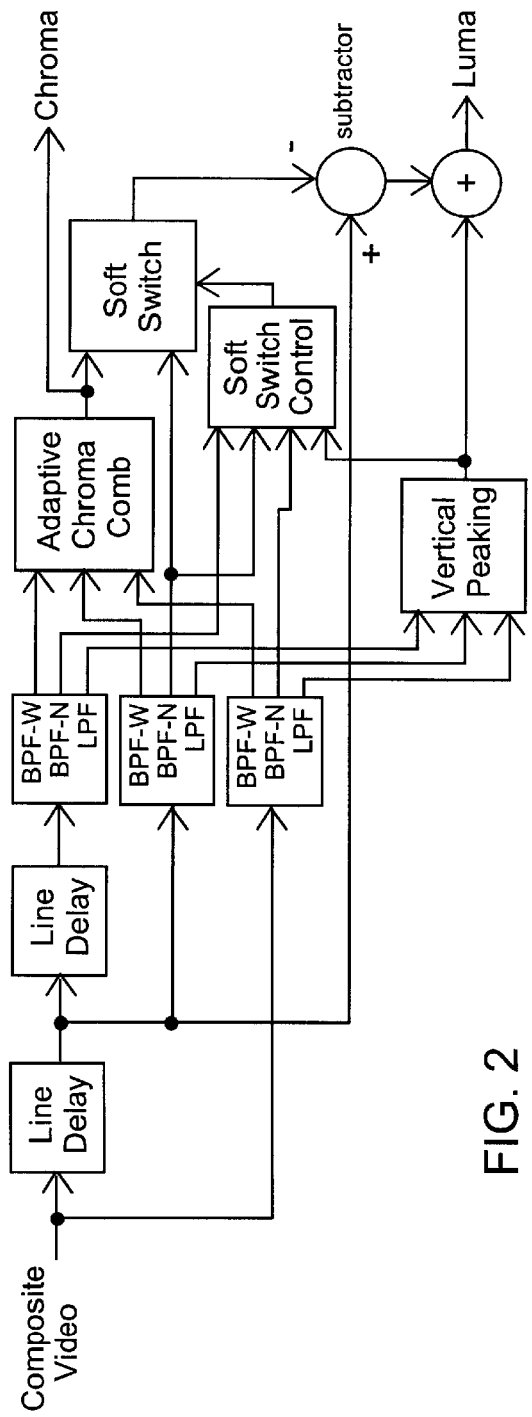
FIG. 2 is a block diagram illustrating an embodiment of the current invention.

FIG. 2 illustrates an improved adaptive comb filter in that hanging dots are significantly reduced over the FIG. 1 apparatus. In the FIG. 2 circuitry the soft switch control circuit is advantageously made responsive to the ratio of the magnitude of bandpassed signal from the middle line to the average magnitude of the bandpass filtered signals from the first and last lines. More particularly the soft switch is responsive to the ratio of the chrominance vectors occurring in the three lines and also to the vertical peaking signal.

The inventor determined that hanging dots are minimized if the following soft switching criteria are observed. First it is assumed that soft switching operates to combine the bandpassed and comb filtered chrominance in proportions of K(Bandpassed Chrominance)+(1−K)(Comb Filtered Chrominance), where K is a variable of one or less. Second, two threshold values are established relating to the magnitude of Vertical Detail, and the magnitude of Vertical Detail is rated according to the threshold values. In particular, the Vertical Detail is rated 0, 1 or 2, depending on the magnitude of Vertical Detail being less than, between or greater than the threshold values. The threshold values differ by 25%. Exemplary threshold values are $VD_{min}$ and $5VD_{min}/4$. Third, the average of the magnitudes of the chrominance vectors of the first (Top) and third (Bottom) video lines is calculated and weighted by two factors to form two further threshold values. The magnitude of the chrominance vector of the second (Middle) line is compared with the two further threshold values and rated 0, 1 or 2 depending on it being less than, between or greater than the two further threshold values. Exemplary weighting factors may be W and 5W/4. Finally the soft switch factor K is determined from the matrix illustrated in Table 1

TABLE 1

|    | 2 | 2 | 6 | 8 |
|----|---|---|---|---|
| VD | 1 | 1 | 4 | 6 |
|    | 0 | 0 | 1 | 2 |
|    |   | 0 | 1 | 2 |
|    |   |   Vm |   |   |

The leftmost values, VD, are the vertical detail rating and the bottom values, Vm, are the vector magnitude rating. The values selected form the table are subsequently divided by 8 to form the respective K factors.

The vertical detail (VD) or peaking signal in FIG. 2 is developed similar to that in FIG. 1. That is, lowpass filtered versions of the three video lines are combined according to the function:

$$VD = abs(M - (T+B)/2)$$

where T, M, and B correspond to the lowpass components of the video signals from the top, middle and bottom (first, second and third) lines of video signal. The 3 dB frequency of the lowpass filters is in the order of 1 MHz.

The chrominance vectors are calculated from signals that are derived from the first, second and third lines of video signal via narrow band bandpass filters designated BPF-N. The BPF-N filters have a spectrum centered on the chrominance subcarrier frequency and 3 dB points in the order of ±0.7 MHz from the subcarrier frequency.

The exemplary circuitry in FIG. 2 is utilized in an analog NTSC interface of a HDTV receiver. In this environment it was convenient to use 18 MHz sampling clocks. The ramifications are that successive chrominance samples do not represent orthogonal components. Consequently the magnitudes of the chrominance vectors can not be generated via the square root of the sum of squares algorithm. A method and circuitry for determining the approximate magnitude of the chrominance vectors was therefore devised. Mathematically the inventive process for approximating the vector magnitude is described thusly:

$$Vm = a_0 s_0 + a_1 s_1 + a_2 s_2 + a_3 s_3 + a_n s_n + C*\text{MAX}(s_i) + D*\text{MIN}(s_i)$$

Where $s_i$ are absolute values of successive signal samples, $a_1$, C and D are weighting coefficients, and $\text{MAX}(s_i)$ and $\text{MIN}(s_i)$ are the largest and least of the absolute values of the n sample values. The number, n, and values of the coefficients are related to the ratio of the frequency of the signal representing the vector to the sample frequency. A function Vm which closely approximates the magnitude of an NTSC chrominance vector represented by a signal sampled at 18 MHz is expressed:

$$Vm = s_0 + s_1 + s_2 + 3\,\text{MAX}(s_i)$$

In this instance, the number n of successive samples is three and all of the coefficients $a_i$ have the value 1, and the coefficient D is zero.

Figure 3:
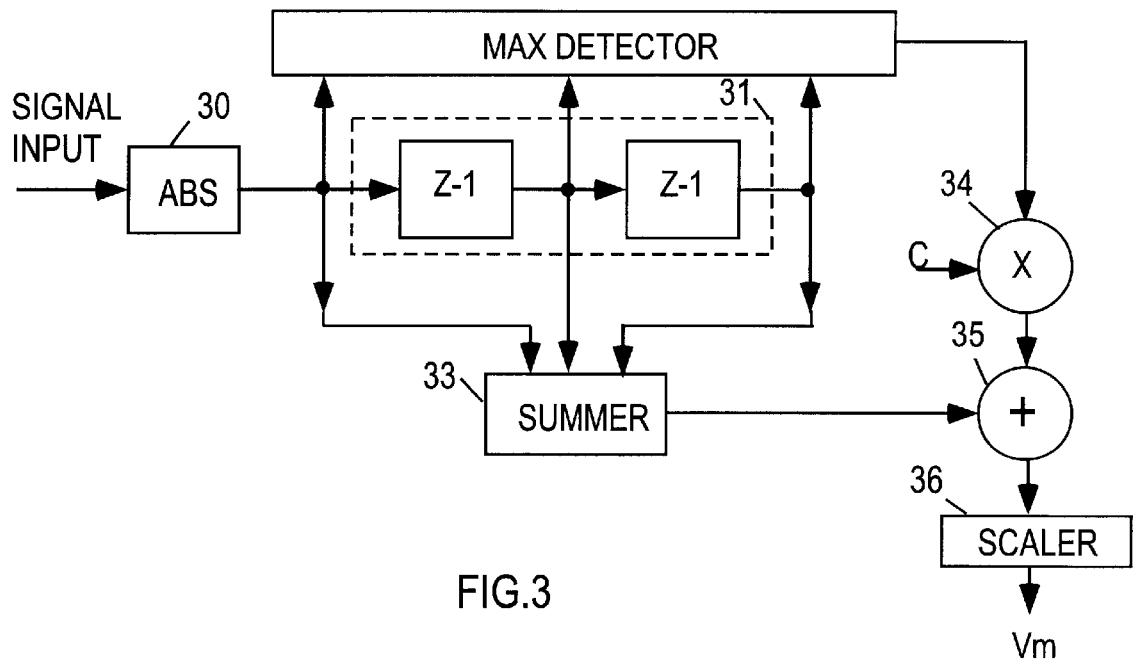
FIGS. 3 and 4 are block diagrams of circuitry embodying the invention, for calculating an approximation of a signal vector.

FIG. 3 illustrates circuitry for approximating this vector in real time. Chrominance signal that has been sampled at 18 MHz is applied to apparatus 30 which generates the absolute values of respective signal samples. Apparatus 30 may be realized by, for example, either a ones complement circuit or a twos complement circuit controlled by the sign bit of respective samples. The absolute values or the respective samples are applied to a tapped delay line including the cascade connected one-sample delay stages 31. Taps are accessed at the respective delay line interconnections. Samples at the respective taps (effectively weighted by the factor one) are applied to a summer 33 which forms the sum $S(1+z^{-1}+z^{-2})$ which is equivalent to $s_0+s_1+s_2$, assuming S is the chrominance signal.

Sample absolute values from the respective taps are also applied to a Max Detector, which determines the sample, $s_i$, having the maximum absolute value. The sample having the maximum absolute value is weighted in the weighting circuit 34. In this example the weighting factor is the value 3. The weighted maximum sample value $3\text{Max}(s_i)$ and the sum $S(1+z^{-1}+z^{-2})$ are applied to a summing circuit 35 which develops successive samples $Vm = S(1+z^{-1}+z^{-2}) + 3\text{MAX}(s_i)$. In this example, the coefficients are not normalized, so the output of the summer 35 is applied to a scaler 36 which normalizes the output values. An exemplary normalization factor for this example may be 7/32.

Figure 4:
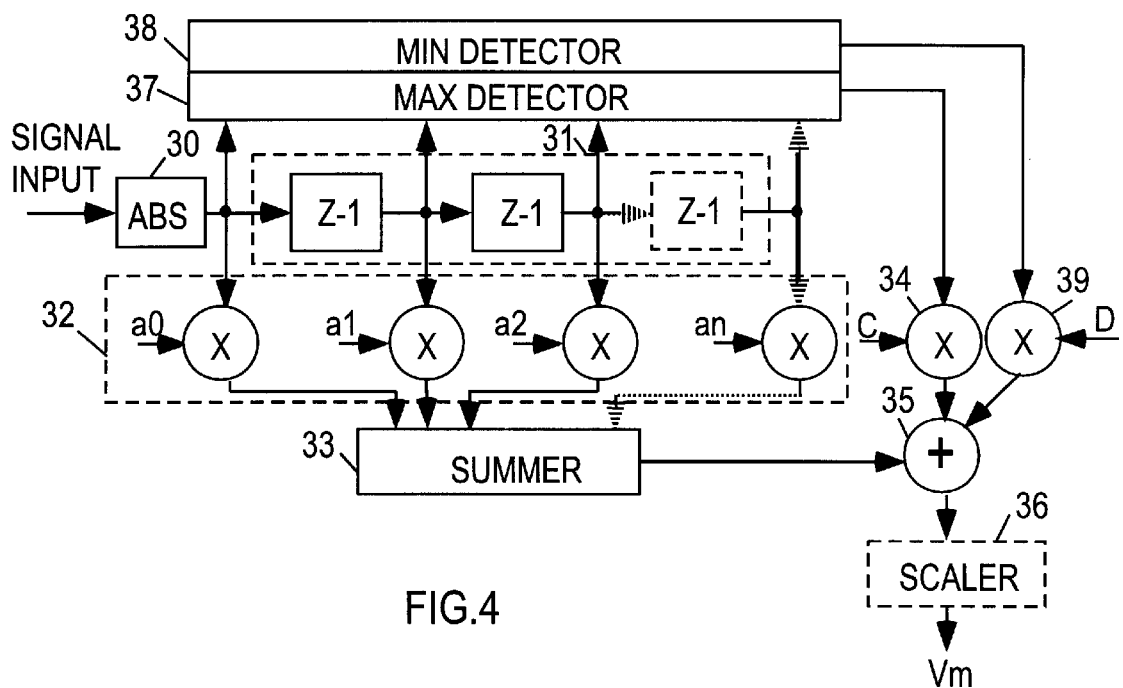

The FIG. 3 apparatus is a simplified version of a vector magnitude detector according to the invention. It generates vector magnitude values to within better than 90% accuracy. FIG. 4 illustrates a full implementation of the vector magnitude algorithm. In this embodiment greater accuracy may be realized in the results. In FIG. 4, elements that are similar to the elements in FIG. 3 are represented with like designations.

As in FIG. 3, the absolute values from element 30 are applied to a tapped delay line including the cascade connected one-sample delay stages 31. Taps are accessed at the respective delay line interconnections. Samples from the respective taps are applied to respective weighting circuits 32, to which respective coefficients $a_i$ are applied. The coefficients may be hard wired to the coefficient input connections or they may be supplied by means of an 12C bus. Weighted samples from the respective weighting circuits are applied to the summer 33 which forms the sum $S(a_0+a_1z^{-1}+a_2z^{-2}+a_nz^{-n})$.

Sample absolute values from the respective taps are also applied to a maximum detector 37 and a minimum detector 38, which respectively determine the maximum and minimum of the sample absolute values $s_i$. The sample having the maximum absolute value is weighted in the weighting circuit 34. The sample having the minimum absolute value is weighted in the weighting circuit 39. The weighted maximum sample value $C^*MAX(s_1)$, the weighted minimum sample value $D^*MIN(s_1)$ and the sum $S(a_0+a_1z^{-1}+a_2z^{-2}+a_ns_n)$, are applied to a summing circuit 35 which develops successive vector magnitudes $Vm=a_0s_0+a_1s_1+a_2s_2+a_ns_nC^*MAX(s_i)+D^*MIN(s_i)$. Output values from the summing circuit 35 may applied to a scaler circuit similar to the scaler circuit 36. However if the coefficients are normalized, the scaler 36 is not needed.

Selecting normalized coefficients $a_0$, $a_1$, $a_2$, C and D to be 0.33, 0.56, 0.336, 0.28 and −0.189 respectively, and all other coefficients as zero valued, results in vector magnitudes of $$Vm=0.33s_0+0.56s_1+0.336s_2 0.28\ MAX(s_i)-0.189\ MIN(s_i).$$

Using these coefficients, chrominance signal vector magnitudes, for 18 MHz samples, are developed to within 1.5-% p-p error.

Alternatively, selecting non-normalized coefficients $a_0$, $a_1$, $a_2$, C and D to be 4, 7, 4, 4 and −2 respectively, and a scale factor of 5/64 in scaler 36, results in chrominance signal vector magnitudes, for 18 MHz samples, to within 2.0% p-p error. Note that while the error of the latter example is slightly larger, the circuitry is considerably simpler since most of the weighting circuits may be realized with bit shifters.

As the ratio of the frequency of the signal representing the vector to the sample frequency becomes larger, fewer samples should be used in the calculation because the signal tends to smear as the samples tend to represent a greater portion of a cycle of the signal. Conversely, as the ratio becomes smaller, more samples may be utilized in the calculation, though it may not be necessary. For example, again considering a chrominance vector but this time represented by signal sampled at 27 MHz, a three sample embodiment according to the relation.

$$Vm=19/128(3s_0+s_1+3s_2+3MAX(s_i)-2MIN(s_i)).$$

produces vector magnitudes to within 2% p-p error.

Figure 5:
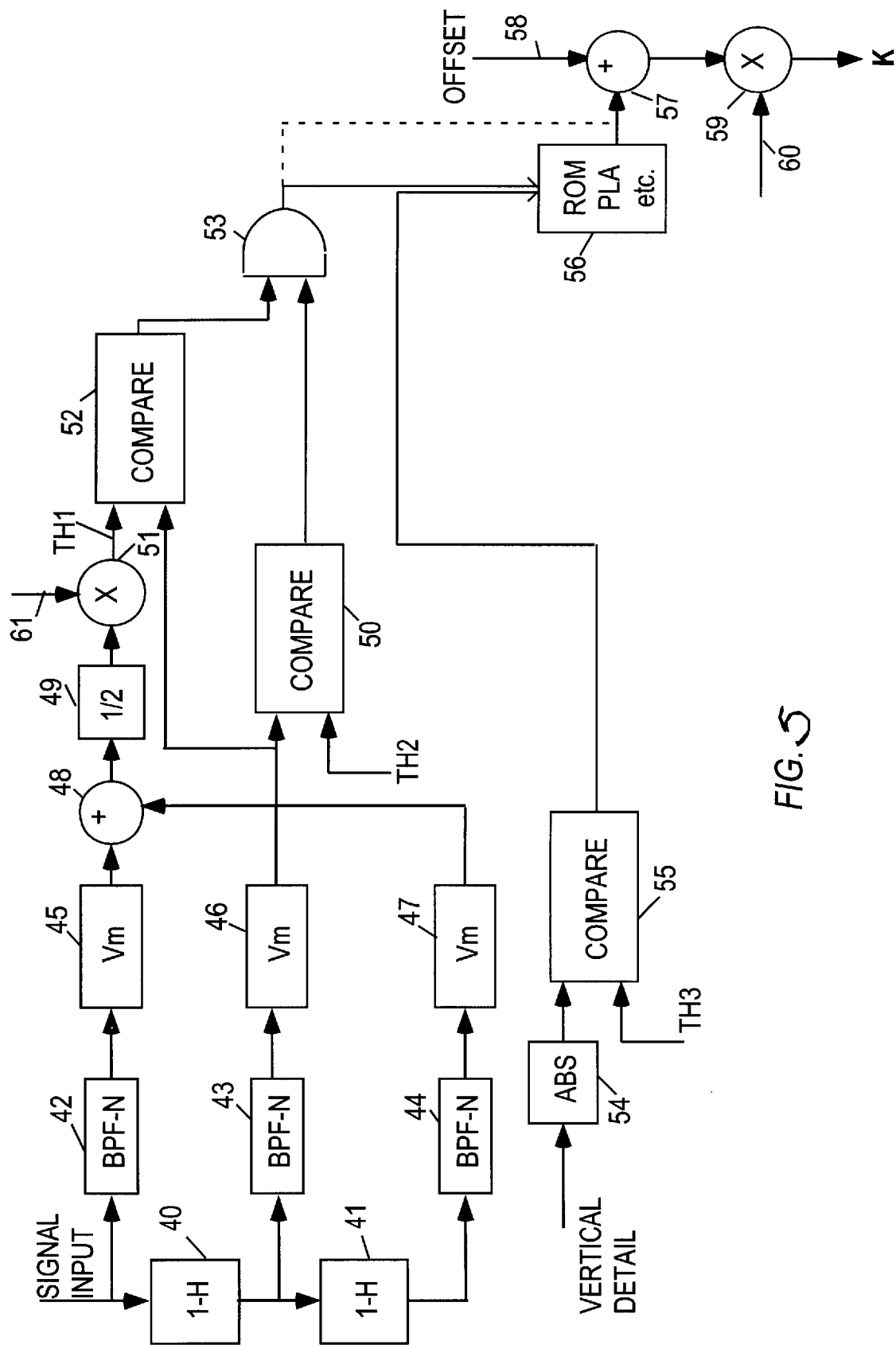
FIG. 5 is a block diagram of exemplary circuitry for generating a control signal to operate the soft switch used in FIG. 2.

FIG. 5 shows an adaptive comb filter with chrominance vector approximation circuitry used for generating soft switch control signal. In FIG. 5 three lines of video signal are made available concurrently from one-H delay lines 40 and 41. The current video signals are applied respectively to bandpass filters 42, 43 and 44. The bandpass filters have a 3 dB bandwidth in the order of 1.4 MHz centered on the chrominance subcarrier. The bandpassed signals are coupled to respective vector magnitude approximating circuits 45, 46 and 47. The approximate vector magnitudes from the top and bottom lines of video signal are summed in the adder 48. The sum is divided by 2 in element 49 to generate the average of these two magnitudes. The average magnitude is applied to a scaling circuit 51. A scale factor value is applied to a multiplier input 61 of the scaling circuit. A system controller via an 12C bus may provide this scale factor, or it may be a fixed value. The output of the scaling circuit is a first threshold value TH1. The threshold value TH1 is applied to a first input of a comparator 52. The approximated vector magnitude from the middle video signal line is applied to a second input connection of the comparator 52. Comparator 52 provides, for example, three output states 0, 2 and 1 for the vector of the middle line being less than the first threshold value TH1, greater than Δ times the first threshold value TH1 and being between the aforedescribed values respectively. Output signal from the comparator 52 is applied to a gating circuit 53.

The vector magnitudes from the middle video line are also applied to a comparator 50. A second threshold value TH2 is applied to a second input of the comparator 50. Threshold value TH2 may be applied from a system controller (not shown) via an 12C bus or it may be a hard-wired value. Threshold value TH2 represents a minimum value of the chrominance signal indicative of the presence or absence of chrominance signal in the middle line. A representative value of TH2 is in the order of 20 IRE. The vector of the middle line is compared to the threshold value TH2 in comparator 50 which has an output coupled to a control input of the gate 53. If the vector of the middle line is less than or greater than the threshold TH2, the state values provided by comparator 52 are inhibited and passed by the gate 53 respectively.

Values provided by the gate 53 may be used directly as soft switch control values K. Alternatively, these values may be applied to an adder 57 wherein an offset value may be added. The offset values may be provided from a system controller via an 12C bus for example. The offset values may be added because the vector state values only indicate that the vector is in one of three magnitude ranges, but are not representative of the actual ranges. The vector representative values with offset added are applied to a scaling circuit 59 to normalize the values to values less than or equal to the value one. Output values from the scaling circuit 59 are an alternative form of K values.

It is advantageous to use the vertical detail or peaking signal in forming the soft switch control signal K. This is accomplished by applying the vertical detail or peaking signal to an absolute value circuit, which provides the absolute values of the vertical detail, or peaking signal. These absolute values are applied to a first input of a comparator 55. A third threshold value TH3 is applied to a second input connection of the comparator 55. Comparator 55 generates a plurality of states depending on the value of the vertical detail or peaking signal relative to the value TH3. For example, comparator 55 may output the states 0, 2 and 1 for the magnitude of vertical detail or peaking being less than TH3, greater than β times TH3 and between TH3 and PTH3 respectively. An exemplary value of β is 5/4. The threshold value TH3 may be provided by a system controller via an 12C bus, and may be variable to allow the user to adjust the level at which peaking is initiated.

The state values provided by comparator 55 are combined with the state values provided by the gate circuit 53. The combined state values are applied to an element 56 which may be a ROM or a PLA programmed to provide values such as the values illustrated in Table 1. These output values are exemplary. More or less output values may be implemented depending upon how fine a vernier control of the soft switch is desired. The output values from the element 56 are applied to the adder 57 previously described with respect to the signals output directly from the gate circuit 53.

The vector approximating apparatus has been described in the environment of an adaptive video signal comb filter. It will be recognized by those skilled in the art of signal processing that this apparatus will also find application in apparatus which performs equalization of quadrature modulated signals, or carrier recovery of such signals. This apparatus may also be utilized for non-coherent detection of quadrature modulated signals, in which instance the vector magnitude circuit operates as an envelope detector.

What is claimed is:

1. A method of approximating the magnitude of a vector represented by a sampled signal, comprising:

providing a sampled signal;

generating the absolute values of the respective samples;

concurrently providing a plurality of successive sample absolute values;

combining said plurality of sample absolute values to from a first sum;

determining the maximum of said plurality of sample absolute values;

weighting said maximum; and combining said first sum and weighted said maximum to form approximated said magnitude of a vector.

2. The method set forth in claim 1 further including weighting respective said plurality of sample absolute values prior to the step of combining.

3. The method set forth in claim 1 wherein said plurality of sample absolute values is three and said maximum is weighted by the factor three.

4. The method set forth in claim 1 wherein said vector magnitude is defined by a function including the terms $\Sigma(a_i S_i)+C$ times $MAX(S_i)$ where $S_i$ aresample absolute values C is a constant weighting factor and $a_i$ are respective weighting coefficients.

5. The method set forth in claim 1 further comprising:

determining the minimum of said plurality of sample absolute values;

weighting said minimum; and combining weighted said minimum, said first sum and weighted said maximum to form approximated said magnitude of a vector.

6. Apparatus for calculating approximations of the magnitude of a vector represented by a sampled signal, comprising:

a source of sampled signal;

absolute value circuitry coupled to said source;

a tapped delay line coupled to said absolute value circuitry for concurrently providing a plurality of samples;

combining circuitry coupled to respective taps of said tapped delay line;

a maximum detector coupled to said tapped delay line for selecting the largest absolute value of samples provided by said taps;

second combining circuitry coupled to said combining circuitry and said maximum detector for providing a sum of sample absolute values and the largest absolute value.

7. The apparatus set in claim 6 further including weighting circuitry coupled between said second combining circuitry and said maximum detector.

8. The apparatus set forth in claim 7 further including respective weighting circuits coupled between respective taps and said combining circuitry.

9. The apparatus set forth in claim 6 wherein the sampled signal is a chrominance component of a video signal and said apparatus further includes:

a comb filter including a soft switch for comb filtering said video signal;

control signal generating circuitry coupled between said second combining circuitry and a control input connection of said soft switch.

10. The apparatus set forth in claim 9 wherein said control signal generating circuitry includes;

second and third vector approximating circuits arranged to approximate vectors in video signal lines occurring before and after a video signal line containing said plurality of samples;

an averager coupled to average vector approximations from said second and third vector approximating circuits;

a comparator coupled to said second combining circuit and said averager; and means coupling an output of said comparator to said control input connection.

11. The apparatus set forth in claim 10 wherein said comparator provides a plurality of output values, respective values indicative of the difference in value of said approximate vector magnitude and said average.

12. The apparatus set forth in claim 6 further including:

a minimum selector coupled to said respective taps for selecting the minimum absolute value provided by said taps;

a weighting circuit coupled to said minimum selector for providing weighted smallest absolute values; and wherein said weighted smallest absolute values are coupled to said second combining circuitry.

13. A method of comb filtering a video signal comprising:

providing a video signal including chrominance and luminance components;

adaptively combining samples from three successive video lines to provide a comb filtered chrominance component;

providing bandpass filtered video signal;

combining the comb filtered chrominance component and the bandpass filtered video signal responsive to a control signal, to provide a further signal;

subtractively combining said further signal from said video signal to provide a comb filtered luminance component; and wherein said control signal is generated by:

forming a vertical peaking signal from said video signal;

calculating a vector magnitude of the chrominance component of at least a middle one of said three successive video lines; and generating control values related to amplitude values of both said vector magnitude and said vertical peaking signal.

* * * * *